(12) United States Patent
Bleakley et al.

(10) Patent No.: US 9,122,658 B2
(45) Date of Patent: *Sep. 1, 2015

(54) WEBPAGE DISPLAY SYSTEM LEVERAGING OSGI

(71) Applicant: INTERNATIONAL BUSINESS MACHINES CORPORATION, Armonk, NY (US)

(72) Inventors: Darrell Bleakley, Raleigh, NC (US); Erik J. Burckart, Raleigh, NC (US); Barnaby L. Court, Morrisville, NC (US); Andrew J. Ivory, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 282 days.

This patent is subject to a terminal disclaimer.

(21) Appl. No.: 13/897,824

(22) Filed: May 20, 2013

(65) Prior Publication Data

US 2014/0344666 A1 Nov. 20, 2014

Related U.S. Application Data

(63) Continuation of application No. 13/895,776, filed on May 16, 2013.

(51) Int. Cl.
*G06F 17/21* (2006.01)
*G06F 17/30* (2006.01)

(52) U.S. Cl.
CPC ........ *G06F 17/212* (2013.01); *G06F 17/30902* (2013.01)

(58) Field of Classification Search
CPC .......................... G06F 17/30902; G06F 17/212
See application file for complete search history.

(56) References Cited

U.S. PATENT DOCUMENTS

| 7,610,351 | B1* | 10/2009 | Gollapudi et al. ............ 709/217 |
| 8,099,671 | B2 | 1/2012 | Arthursson et al. |
| 2008/0046882 | A1* | 2/2008 | Blackhouse .................. 717/174 |

(Continued)

OTHER PUBLICATIONS

Neugebauer, M.; "Metalevel database programming and visualization with POETView"; Database Issues for Data Visualization; IEEE Visualization '95 Workshop Proceedings; pp. 131-144; Springer-Verlag; 1996.

(Continued)

*Primary Examiner* — Scott Baderman
*Assistant Examiner* — Asher Kells
(74) *Attorney, Agent, or Firm* — Law Office of Jim Boice

(57) ABSTRACT

A method, system, and/or computer program product generate and present a webpage on a user interface. A request for an initial page view of an initial page is transmitted from a client computer to a server-side layout manager in a server that is OSGi enabled. The client computer receives a copy of the initial page view, a client-side rendering engine, and a client-side layout manager from the server. The client-side layout manager parses out client-side controllers from the client-side layout manager to determine which views are to be pre-fetched before generating a requested webpage. The client-side layout manager invokes the client-side rendering engine to pre-fetch and cache selected views of particular webpages. The client-side layout manager then invokes the client-side rendering engine to build and render the requested webpage from the initial page view and one or more of the cached views.

7 Claims, 6 Drawing Sheets

(56) References Cited

U.S. PATENT DOCUMENTS

| | | |
|---|---|---|
| 2010/0229165 A1 | 9/2010 | Normington et al. |
| 2012/0166983 A1 | 6/2012 | Demant et al. |
| 2014/0258545 A1* | 9/2014 | Huang et al. ............... 709/226 |

OTHER PUBLICATIONS

Anonymous; "Method and system for managing function modules dynamically in OSGi based web applications"; http://priorartdatabase.com/IPCOM/000199285; Aug. 30, 2010, pp. 1-8.

IBM; "Hierarchical Model View Controller User Interface Language (HMVCUL)"; http://www.ip.com/pubview/IPCOM000160727D; Nov. 27, 2007, pp. 1-3.

IBM; "Method and Process for Leveraging Social Networks in Collaborative Interfaces"; http://www.ip.com/pubview/IPCOM000152424D; May 3, 2007, pp. 1-2.

Wikipedia Contributors, "Dojo Toolkit", Wikipedia, The Free Encyclopedia, n.d., Page Version ID: 530988969, pp. 1-13, retrieved Jan. 23, 2013.

Christopher Brind, "vaadin-osgi Add-on", Vaadin Ltd., 2012, <http://vaadin.com/directory>, pp. 1-2, retrieved May 16, 2013.

Peter Kriens, "OSGi and the User Interface", OSGi Alliance Blog, OSGi (TM) Alliance, Jan. 31, 2006, pp. 1-3.

Rene Pawlitzek, "Embedding Hamlets", IBM developerWorks, IBM, Jun. 19, 2007, pp. 1-21.

* cited by examiner

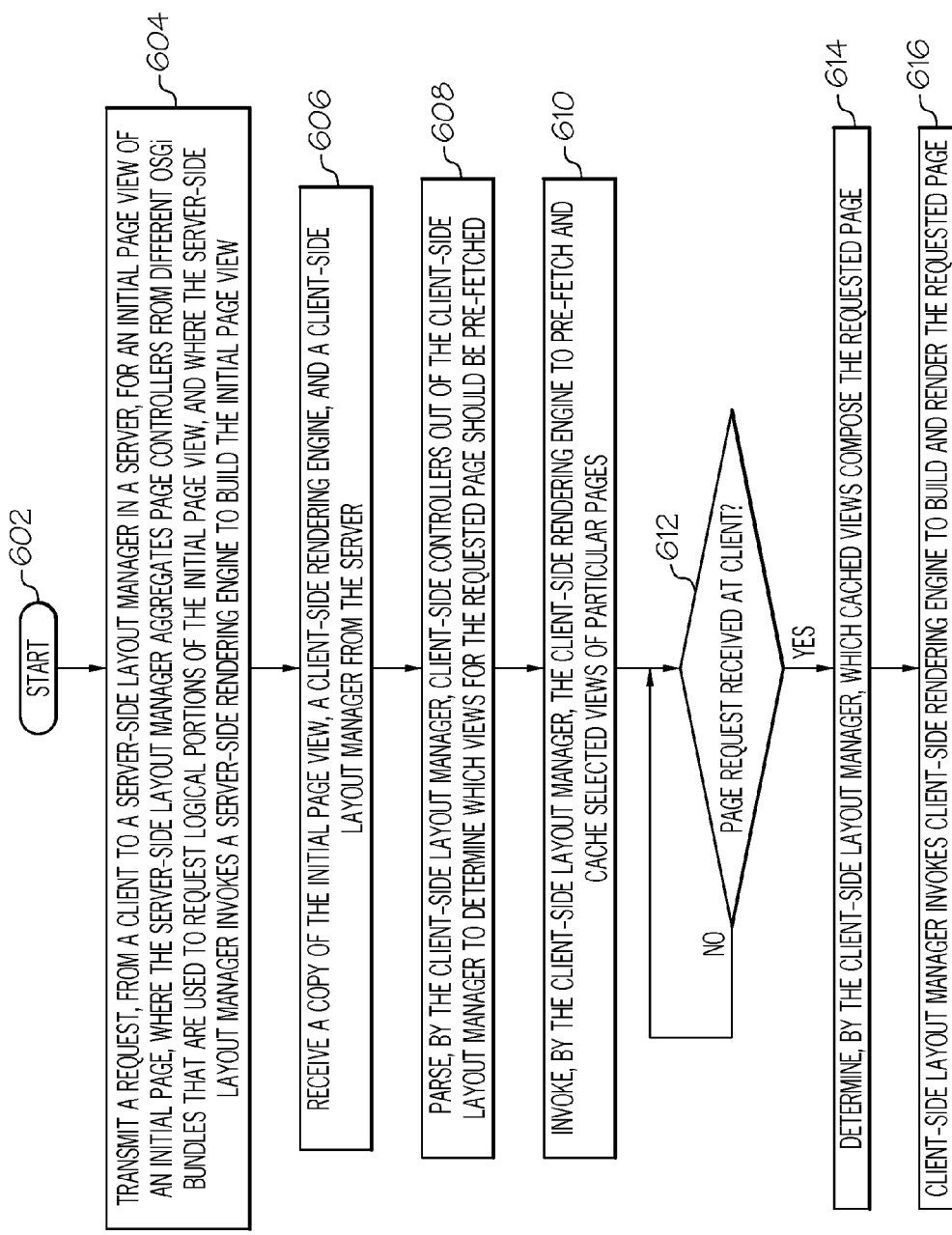

WEBPAGE DISPLAY SYSTEM LEVERAGING OSGI

BACKGROUND

The present disclosure relates to the field of computers, and specifically to the use of user interfaces on computers. Still more particularly, the present disclosure relates to use of an Open Services Gateway initiative (OSGi) in generating webpages.

A webpage is a document or other resource that is visually displayed on a user interface. Webpages are accessed through a web browser, which utilizes a network address of a specific webpage. Most webpages are found on the World Wide Web.

SUMMARY

A method, system, and/or computer program product generate and present a webpage on a user interface. A request for an initial page view of an initial page is transmitted from a client computer to a server-side layout manager in a server that is OSGi enabled. The client computer receives a copy of the initial page view, a client-side rendering engine, and a client-side layout manager from the server. The client-side layout manager parses out client-side controllers from the client-side layout manager to determine which views are to be pre-fetched before generating a requested webpage. The client-side layout manager invokes the client-side rendering engine to pre-fetch and cache selected views of particular webpages. The client-side layout manager then invokes the client-side rendering engine to build and render the requested webpage from the initial page view and one or more of the cached views.

BRIEF DESCRIPTION OF THE SEVERAL VIEWS OF THE DRAWINGS

FIG. 6 is a high level flow chart of one or more exemplary steps taken by one or more processors to generate a webpage through the use of a client-side layout manager and rendering machine.

DETAILED DESCRIPTION

Figure 1:
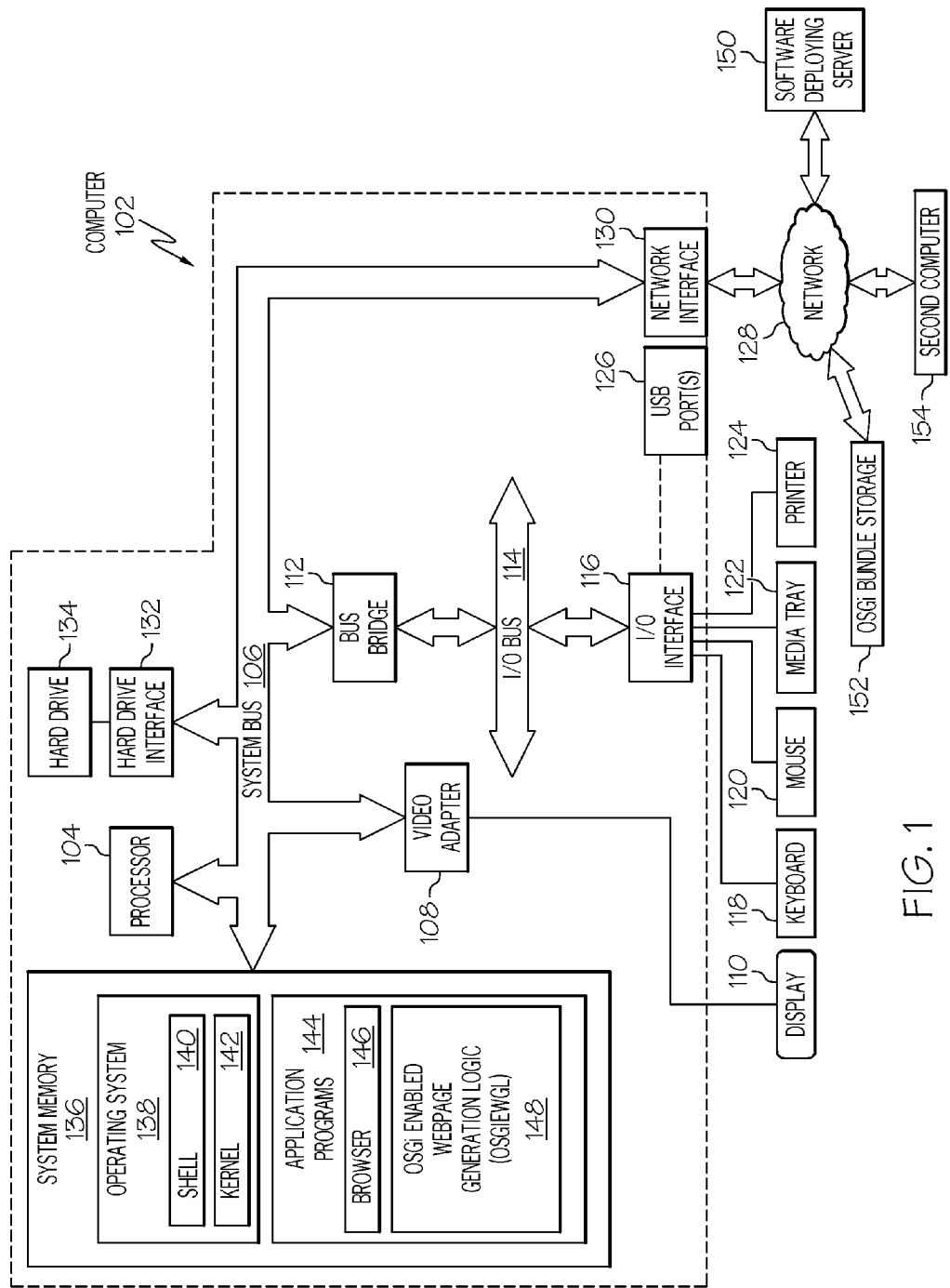
FIG. 1 depicts an exemplary system and network which may be used to implement the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or a second computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a speaker 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems such as second computer 154.

Application programs 144 in computer 102's system memory (as well as software deploying server 150's system memory) also include an OSGi enables webpage generation logic (OSGIEWGL) 148. OSGIEWGL 148 includes code for implementing the processes described below, including those described in FIGS. 2-6. In one embodiment, computer 102 is able to download OSGIEWGL 148 from software deploying server 150, including in an on-demand basis, wherein the code in OSGIEWGL 148 is not downloaded until needed for execution. Note further that, in one embodiment of the present invention, software deploying server 150 performs all of the functions associated with the present invention (including execution of OSGIEWGL 148), thus freeing computer 102 from having to use its own internal computing resources to execute OSGIEWGL 148.

The OSGi bundle storage 152 is a mass storage facility that contains OSGi bundles, which are groups of Java® classes ("Java" is a registered trademark of Oracle in the United States and/or other countries) within the OSGi system.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
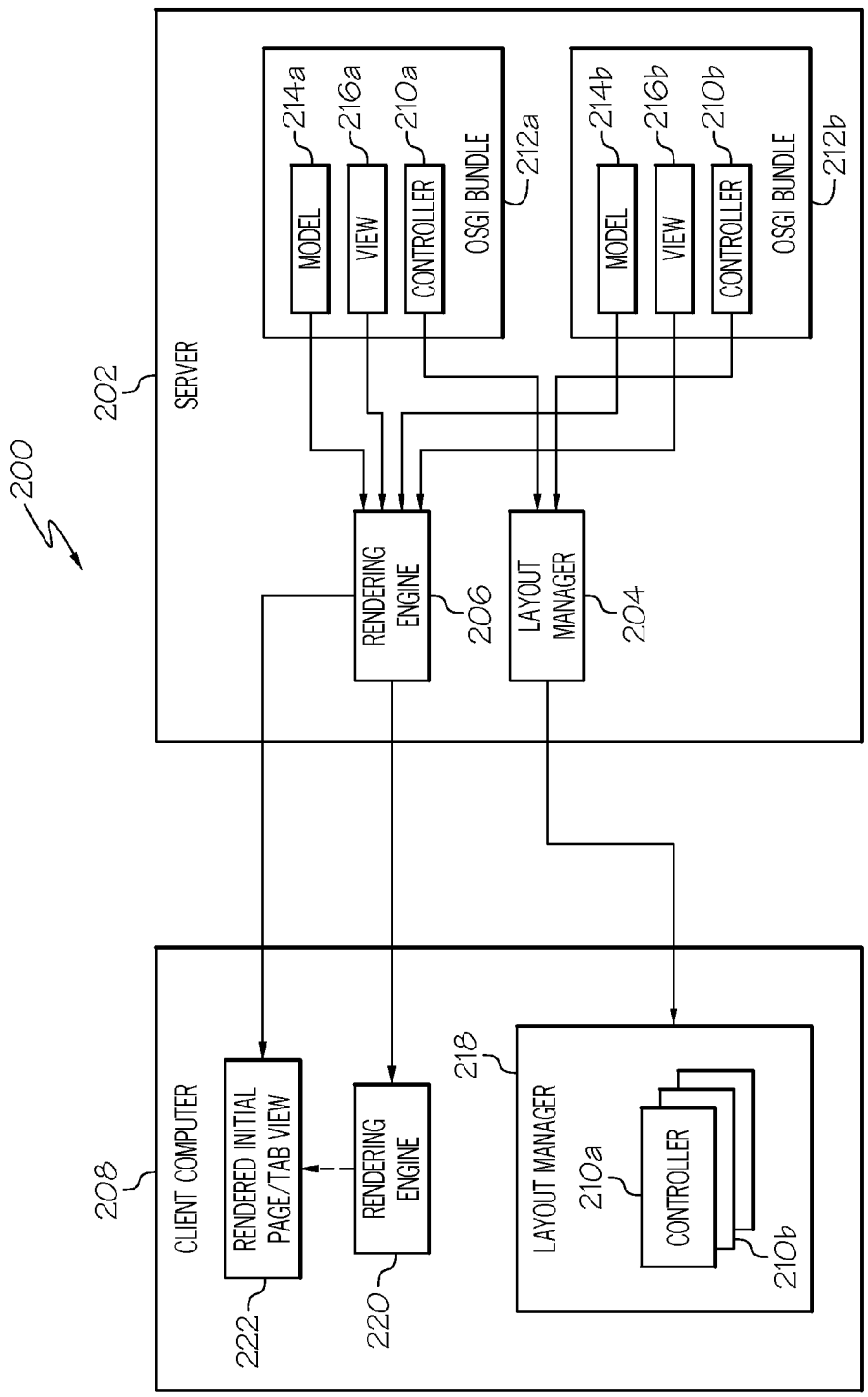
FIG. 2 illustrates an exemplary system for consolidating various MVC controllers into a single layout manager.

With reference now to FIG. 2, an exemplary system 200 for consolidating various MVC controllers into a single layout manager is presented. A server 202 (e.g., second computer 154 depicted in FIG. 1) includes a server-side layout manager 204 and a server-side rendering engine 206. When a client computer 208 (e.g., computer 102 depicted in FIG. 1) makes a request to the server-side layout manager 204 for an initial page load (i.e., a minimal view of a webpage), the server-side layout manager 204 aggregates multiple MVC-based controllers 210a-210b from different Open Services Gateway initiative (OSGi) bundles 212a-212b (which in one embodiment are stored in the OSGi bundle storage 152 depicted in FIG. 1).

OSGi is a module system and service platform for Java® code in which applications can be remotely installed, started, stopped, updated, and uninstalled without a reboot. Groups of Java® classes within the OSGi system are known as "bundles". In the exemplary embodiment of the present disclosure depicted herein, the OSGi bundles 212a-212b include various Model-View-Controller (MVC) components.

MVC is a software architecture pattern used to generate webpages. MVC includes a Model, View, and Controller. When a user requests that a particular webpage be generated, a request is sent to the Controller. The controller then manipulates the Model by updating the model's state. The model notifies the View that there has been a change to its state, thus allowing the view(s) to produce updated output (i.e., updated webpages).

As depicted in FIG. 2, the MVC architecture is modified to overcome the traditional MVC requirement that 1) each controller/model/view is dedicated to a particular webpage, and 2) the controller and model are run exclusively on a server. Rather, in the present invention the rendering engine 206 includes MVC models 214a-214b and MVC views 216a-216b from different OSGi bundles 212a-212b. That is, the rendering engine 206 allows cross-bundle collections of MVC models and views to be incorporated into a single logic (rendering engine 206), while a layout engine allows cross-bundle MVC controllers to be incorporated into another singular logic (layout manager 204). Although this dispersal of the various MVC components initially disrupts the MVC architecture, as will be described herein, this process allows the client server 208 to have greater autonomy in generating webpages.

As further depicted in FIG. 2, a copy of the server-side layout manager 204 (containing the MVC controllers 210a-210b) is then sent to the client computer 208 as a client-side layout manager 218. Similarly, a copy of the server-side rendering engine 206 is sent to the client computer 208 as a client-side rendering engine 220. Using the MVC component information from the OSGi bundles 212a-212b, a rendered initial page/tab view 222, which describes an initial outline view (i.e., without views, data, etc. needed for the final complete/requested webpage) of a requested webpage, is generated by the server-side rendering engine 206, or alternatively, by the client-side rendering engine 220.

Figure 3:
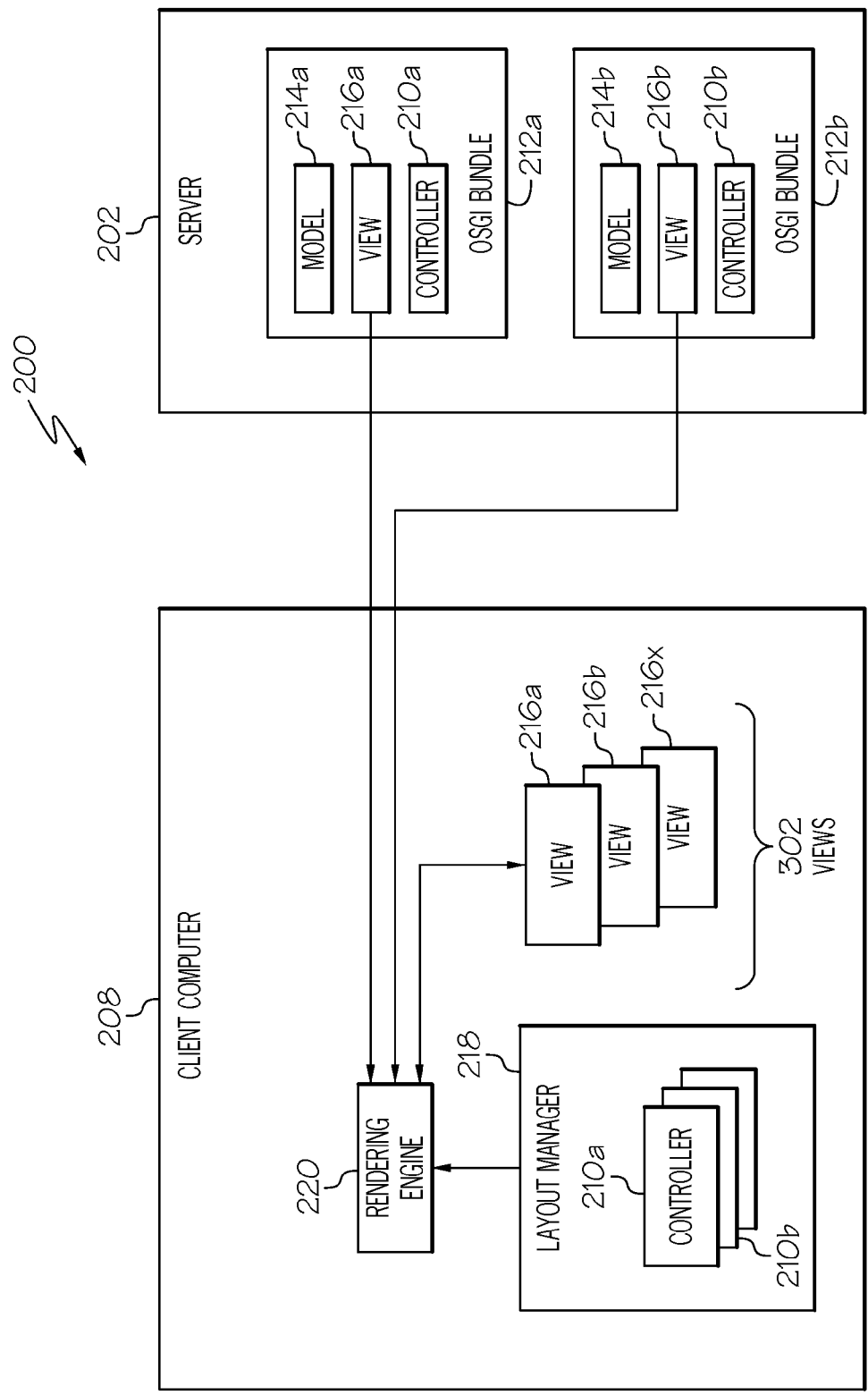
FIG. 3 depicts a client-side layout manager and rendering engine.

With reference now to FIG. 3, the system 200 depicted in FIG. 2 proceeds in its functionality by executing additional features/processes of/from the client 208, and more specifically the features of the client-side layout manager 218 and the client-side rendering engine 220. As depicted, the client-side layout manager 218 parses out the client-side controllers (depicted as controllers 210a-210b) and determines which of the views 302 should be pre-fetched. That is, the layout manager 218 includes logic that identifies, based on a current request, historical experience, etc. which views will be needed to generate a single webpage (made up of multiple consolidated views) or a set of multiple webpages (each being made up of one view, and together making up a website of multiple webpages). Once the layout manager 218 determines which view from views 302 should be cached for future use, these views (e.g., views 216a-216b) are cached in a local cache within client computer 208.

Figure 4:
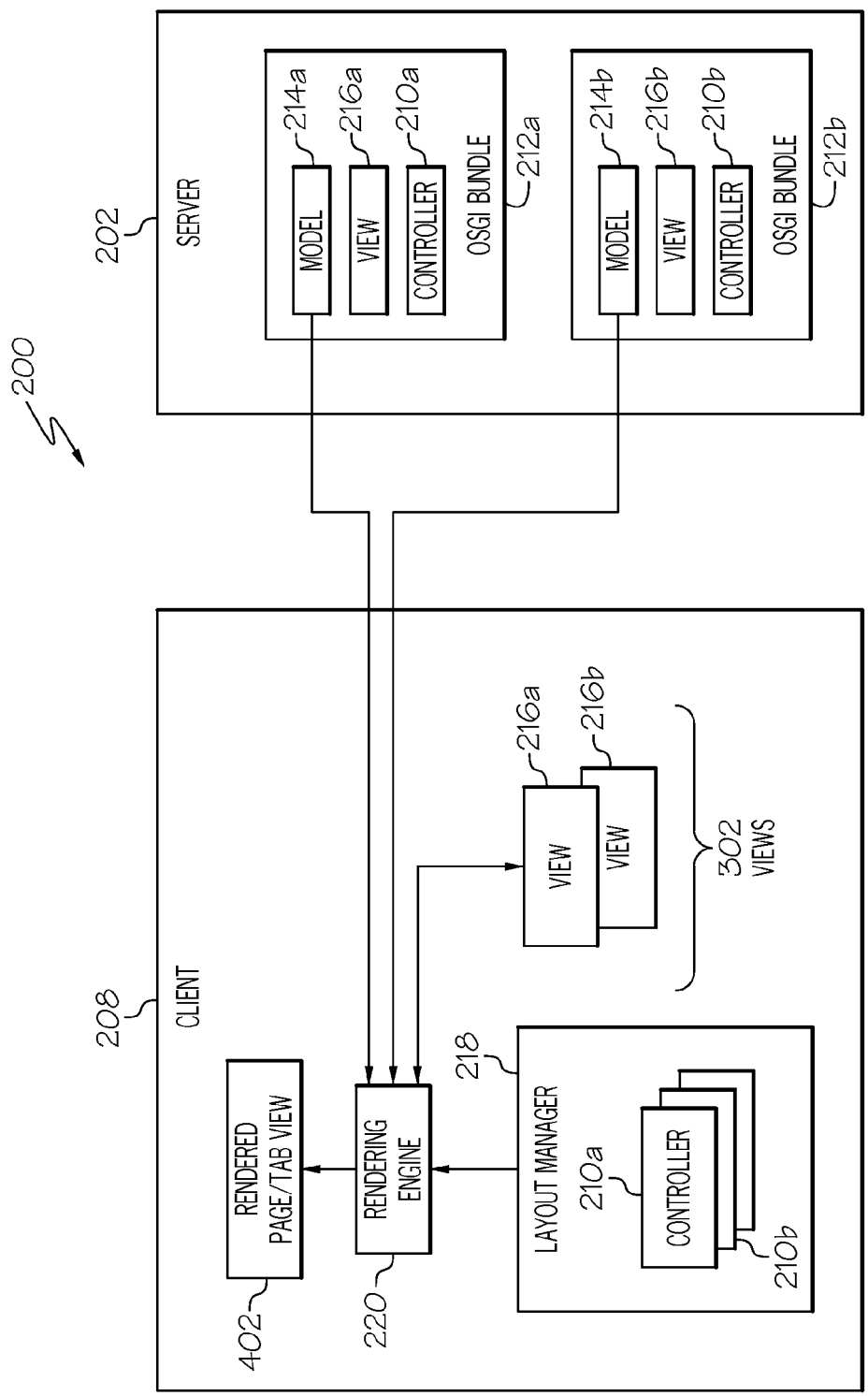
FIG. 4 illustrates the client-side layout manager and rendering engine depicted in FIG. 2 rendering a webpage.

With reference now to FIG. 4, assume that a request has been entered into client 208 for a particular webpage. The appropriate (and previously parsed) controller (e.g., controller 210a and/or controller 210b) and view (e.g., view 216a and/or view 216b, which in one embodiment have been previously cached) are input into the client-side rendering engine 220, along with the corresponding models 214a and/or 214b from the server 202, in order to generate and display the final rendered page/tab view 402 of the requested particular webpage.

Figure 5:
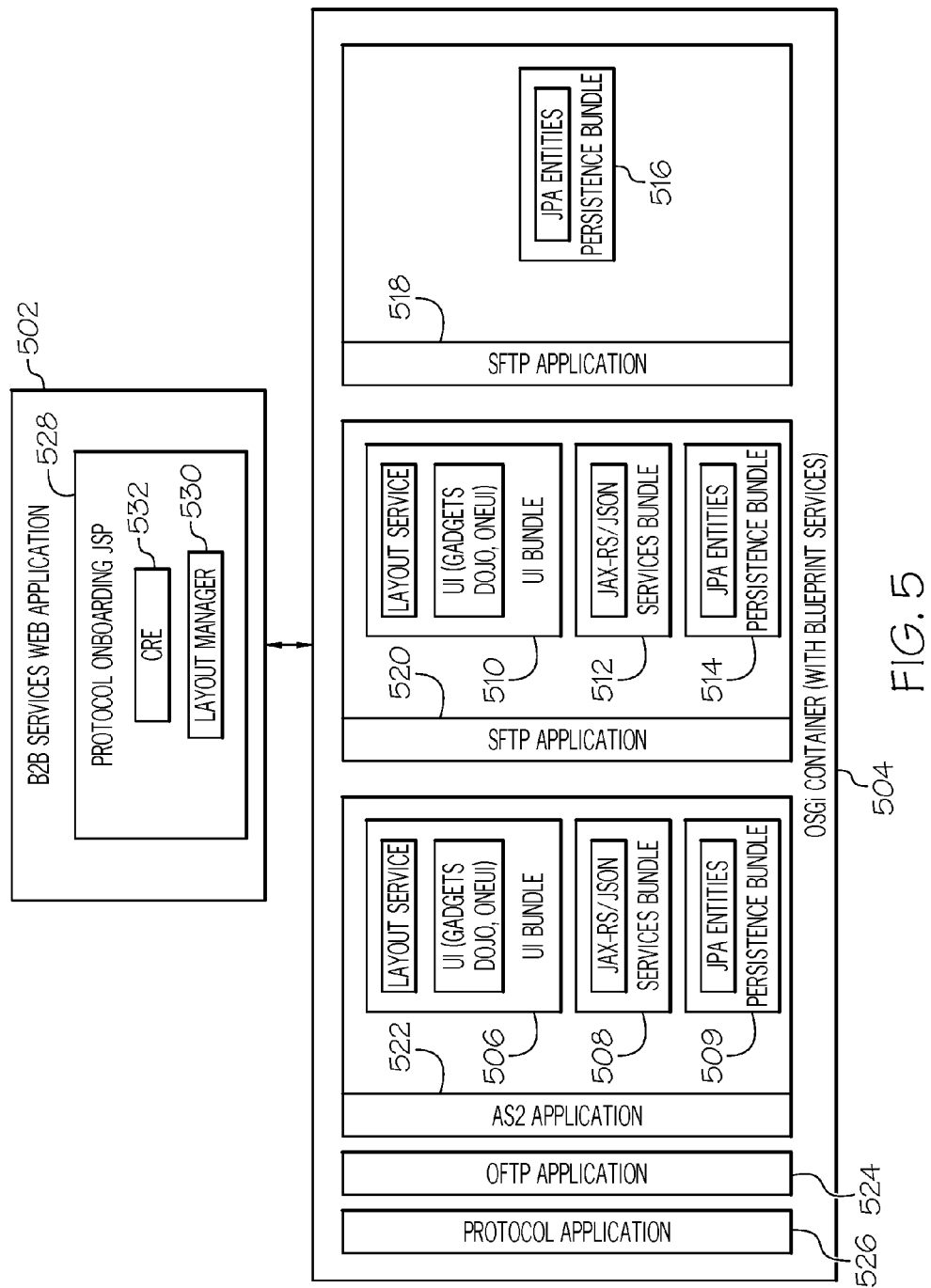
FIG. 5 depicts a business-to-business (B2B) services web application's interaction with an OSGi container having blueprint services in accordance with one embodiment of the present invention.

In one embodiment, the client-side components depicted in FIGS. 2-4 are incorporated into a composable user interface architecture. With reference then to FIG. 5, an interaction between an exemplary business-to-business (B2B) services web application 502 and an OSGi container 504 having blueprint services is depicted in accordance with one embodiment of the present invention. Various MVC bundles (506, 508, 509, 510, 512, 514, 516) are stored within the OSGi container 504. For example, a secure file transfer program (SFTP) application 518 contains an MVC persistence bundle 516, which is used by a Java Persistence API (JPA), which is a Java entity framework used to manage relational data in applications. That is, the persistence bundle 516 contains that JPA, which manages how relational data is mapped to Java objects (known as "persistent entities"), how these objects/entities are stored in a relational database for subsequent access, and how to keep these objects/entities "alive" (i.e., defined and accessible) even after the application that originally used them ends.

Note that the depicted Secure File Transfer Protocol (SFTP) application 520 contains three MVC bundles: UI bundle 510 (used for laying out the user interface appearance); services bundle 512 (used to provide access to services such as JavaScript Object Notation (JSON) used in generating human-readable data interchange); and persistence bundle 514, which provides the same persistence features described above for persistence bundle 516.

Similarly, the Applicability Statement 2 (AS2) application 522 provides an environment for transporting data securely over the Internet using digital certificates and encryption. Associated with AS2 application is a UI bundle 506 (similar in form and function to UI bundle 510 described above); services bundle 508 (similar to services bundle 512), and persistence bundle 509 (similar to persistence bundle 514). Other applications, including an Odette File Transfer Protocol (OFTP) application 524 (which enables the use of the OFTP protocol used for electronic data interchange (EDI) between two communications business partners), and protocol application 526 (used to define what protocols are used for data storage and/or communication) also include various MVC bundles, such as those depicted in the other applications (522, 520, and 518).

Note that in one embodiment, the B2B services web application 502 includes a protocol onboarding JavaServer Pages (JSP) 528, which allows Java developers to dynamically generate webpages by interacting with the OSGi container 504. Within the protocol onboarding JSP 528 is a layout manager 530 and a composable rendering engine 532. The composable rendering engine 532 renders webpages based on inputs from the layout manager 530, both of which are derived from the applications/bundles in the OSGi container 504. That is, in one embodiment the CRE 532 uses directives from bundles such as services bundle 508 and persistence bundle 509, while the layout manager 530 uses directives from bundles such as UI bundle 506. Together, the CRE 532 and layout manager 530 are thus able to dynamically compose webpages based on information/directives from the OSGi container 504.

With reference now to FIG. 6, a high level flow chart of one or more exemplary steps taken by one or more processors to generate a webpage through the use of a client-side layout manager and rendering machine is presented. After initiator block 602, a request is transmitted for an initial page view of an initial page (block 604). (Note that unless otherwise stated, the terms "page" and "webpage" are used interchangeably in the present disclosure.) In one embodiment, this request is transmitted from a client computer (e.g., client computer 208 shown in FIG. 2) to a server-side layout manager (e.g., layout manager 204 in FIG. 2) in a server (e.g., server 202 shown in FIG. 2). As described herein, in one embodiment the server-side layout manager aggregates page controllers (e.g., elements 210a-210b in FIG. 2) from different Open Services Gateway initiative (OSGi) bundles (e.g., elements 212a-212b in FIG. 2). These page controllers are used to request logical portions of the initial page view. As further described herein, in one embodiment each of the OSGi bundles includes a model component (e.g., element 214a in FIG. 2), a view component (e.g., element 216a in FIG. 2), and a controller component (e.g., element 210a in FIG. 2). As described herein, the server-side layout manager invokes a server-side rendering engine to build the initial page view by utilizing these different OSGi bundles.

As described in block 606, the client then receives a copy of the initial page view (e.g., element 222 in FIG. 2), a client-side rendering engine (e.g., element 220 in FIG. 2), and a client-side layout manager (e.g., element 218 in FIG. 2) from the server.

As described in block 608, the client-side layout manager then parses out client-side controllers from the client-side layout manager. These controllers provide the logic to determine which views, for the requested page, should be pre-fetched before generating a webpage.

As described in block 610, the client-side layout manager invokes the client-side rendering engine to pre-fetch and cache selected views of particular webpages. In one embodiment, these particular webpages include a predetermined webpage, such as a webpage that has been previously requested by a user of the client computer.

As depicted in query block 612, a query is made to determine if there has been a request at the client computer for a particular webpage. As described in block 614, in response to the client computer receiving such a request for this particular webpage (which is derived from the initial page that was described in the initial page view delivered by the server), the client-side layout manager then determines which cached views are needed to compose the requested page.

As described in block 616, the client-side layout manager then invokes the client-side rendering engine to build and render the requested webpage from the initial page view and one or more of the cached views. The process ends at terminator block 618.

Note that, in one embodiment, the server-side layout manager aggregates the page controllers from the different OSGi bundles by inserting the page controllers at plugin points of the model component. That is, different MVC controllers ("page controllers") are pulled from disparate OSGi bundles, and then are inserted into a MVC model at predefined (by the layout manager) plugin points. This MVC model component, with the plugged in page controllers, is then transmitted from the server to the client computer.

In one embodiment, the client-side rendering engine asynchronously renders subsequent versions of the requested page by a combination of retrieved model components from the server and one or more views from the client computer. That is, the client-side rendering engine is able to update a particular page into subsequent versions of that particular page by retrieving other MVC model components from the server, while obtaining the MVC views from the local cache in the client computer.

In one embodiment, the client-side rendering engine asynchronously renders multiple webpages based on different combinations of retrieved model components from the server and different views from the client computer. That is, the client-side rendering engine is able to generate multiple webpages (which together may make up a website) by updating/modifying a first page into subsequent versions of that particular first webpage, thus creating a set of different webpages. This is accomplished by retrieving various MVC model components from the server, while obtaining various MVC views from the local cache in the client computer.

In one embodiment of the present invention, the multiple OSGi bundles (e.g., elements 212a-212b depicted in FIG. 2), may be located in a single server, as depicted in FIG. 2. In another embodiment, however, these multiple OSGi bundles are located in multiple (i.e., different) servers, such that the various OSGi bundles are spread across multiple servers.

In one embodiment of the present invention, a particular set of OSGi bundles is registered during the initial startup of the server. That is, when the server (e.g., server 202 depicted in FIG. 2) is initialized, a certain set of OSGi bundles are registered with that server (and in one embodiment, only with that server, thus making that "only" server unique when compared to other servers in their ability to provide certain predefined OSGi bundles). In this embodiment, this particular set of OSGi bundles (i.e., those that were registered with the server during initialization) is then utilized to generate the initial page view and the requested webpage.

As described herein, the present invention provides a hybrid MVC controller that runs both server-side and client-side. The present invention enables multiple OSGi based applications (running on single or multiple servers) to contribute their own MVC models, views and controllers to the user interface.

The present invention also creates a server-side controller that can aggregate the individual OSGi bundles' controller logic using plugin points. This aggregated controller is then pushed to the client side.

The present invention also enables the leveraging of a macro component model to create views and define plugin points that can span multiple OSGi bundles, and also enables the leveraging of a rendering engine for both the client and server controllers to call out, compose, and render the pages.

The present invention also creates a client-side controller that is extended to asynchronously pre-fetch additional related views, and to then invoke controller logic at the client side.

The present invention also creates a client-side controller that is extended to invoke the rendering engine (at the client side) for composing and rendering webpages.

Various advantages are provided by the present invention over the prior art, including, but not limited to: 1) Web UIs can be constructed from multiple OSGi bundles located either on the same server or across multiple servers; 2) Individual pages can be constructed differently based on the particular set of OSGi bundles that were registered during startup; 3) Web UIs can take advantage of server-side construction for the initial page load, thus taking advantage of the decrease in server round trips for the individual views and data; 4) Additional views are pre-fetched asynchronously and cached so that client-side controlled pages load quickly; and 5) Client-side rendered pages only need to fetch their data when loaded.

Note that the flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A method of generating and presenting a webpage on a user interface, the method comprising:
transmitting, by one or more processors, a request for an initial webpage view of an initial webpage, wherein the request is transmitted from a client computer to a server-side layout manager in a server, wherein the server-side layout manager aggregates page controllers from different Open Services Gateway initiative (OSGi) bundles that are used to request logical portions of the initial webpage view, wherein each of the OSGi bundles comprises a model component, a view component, and a controller component that all conform with a Model-View-Controller (MVC) architecture pattern, and wherein the server-side layout manager invokes a server-side rendering engine to build the initial webpage view by utilizing the different OSGi bundles;
receiving, at the client computer and from the server, a copy of the initial webpage view, a client-side rendering engine, and a client-side layout manager;
parsing, by the client-side layout manager, client-side controllers out of the client-side layout manager to determine which views for a requested webpage are to be pre-fetched before generating a webpage;
invoking, by the client-side layout manager, the client-side rendering engine to pre-fetch and cache selected views of particular webpages;
in response to the client computer receiving a request for the requested webpage that is derived from the initial webpage, determining, by the client-side layout manager, which cached selected views compose the requested webpage; and
invoking, by the client-side layout manager, the client-side rendering engine to build and render the requested webpage from the initial webpage view and one or more of the cached selected views.

2. The method of claim 1, further comprising:
aggregating, by the server-side layout manager, the page controllers from the different OSGi bundles by inserting the page controllers at plugin points of the model component; and
transmitting the model component with plugged in page controllers from the server to the client computer.

3. The method of claim 1, further comprising:
asynchronously rendering, by the client-side rendering engine, subsequent versions of the requested webpage by a combination of retrieved model components from the server and one or more views from the client computer.

4. The method of claim 1, further comprising:
asynchronously rendering, by the client-side rendering engine, a set of multiple webpages based on different combinations of retrieved model components from the server and different views from the client computer.

5. The method of claim 1, wherein the different OSGi bundles are located in the server.

6. The method of claim 1, wherein the different OSGi bundles are located in multiple servers.

7. The method of claim 1, further comprising:
registering a particular set of OSGi bundles during startup of the server; and
utilizing the particular set of OSGi bundles to generate the initial webpage view and the requested webpage.

* * * * *